United States Patent [19]

Gelman et al.

[11] Patent Number: 5,341,474
[45] Date of Patent: Aug. 23, 1994

[54] COMMUNICATIONS ARCHITECTURE AND BUFFER FOR DISTRIBUTING INFORMATION SERVICES

[75] Inventors: Alexander Gelman, Brooklyn, N.Y.; Haim Kobrinski, Colts Neck, N.J.; Lanny S. Smoot, Morris Township, Morris County, N.J.; Stephen B. Weinstein, Summit, N.J.

[73] Assignee: Bell Communications Research, Inc., Livingston, N.J.

[21] Appl. No.: 884,515

[22] Filed: May 15, 1992

[51] Int. Cl.$^5$ .......................... G06F 13/00; H04H 1/02
[52] U.S. Cl. ...................................... 395/200; 395/250
[58] Field of Search ................................. 395/200, 250

[56] References Cited

U.S. PATENT DOCUMENTS

| | | | |
|---|---|---|---|
| 4,963,995 | 10/1990 | Lang | 358/335 |
| 5,027,400 | 6/1991 | Baji et al. | 380/20 |
| 5,057,932 | 10/1991 | Lang | 358/335 |
| 5,130,792 | 7/1992 | Tindell et al. | 358/85 |
| 5,132,992 | 7/1992 | Yurt et al. | 375/122 |
| 5,133,079 | 7/1992 | Ballantyne et al. | 455/4.1 |
| 5,164,839 | 11/1992 | Lang | 358/335 |
| 5,224,213 | 6/1993 | Dieffenderfer et al. | 395/250 |
| 5,239,540 | 8/1993 | Rovira et al. | 370/77 |

OTHER PUBLICATIONS

Gelman, et al, "A Store-And-Forward Architecture for Video On Demand Service", Proceeding of the IEEE ICC '91 Denver Colorado, 1991.

"MPEG: A Video Compression Standard for Multimedia Applications," D. LeGall, *Communications of the ACM*, vol. 34, No. 4, Apr. 1991.

"Digital Compressed VOD-An Alternative System View,-"A. Futro Specs Technology, vol. 4, No. 1, pp. 1-6, Jan. 1992.

"Acknowledgment and Correction," Scott Bachman Specs Technology, vol. 4, No. 4, p. 6, Jun. 1992.

*Primary Examiner*—Dale M. Shaw
*Assistant Examiner*—Fran R. Faller
*Attorney, Agent, or Firm*—Leonard Charles Suchyta; Loria B. Yeadon

[57] ABSTRACT

A store-and-forward architecture which stores and distributes information programs to subscribers includes: information warehouses which archive information programs and dispense information programs in segments to central offices in bursts; central offices which manage subscriber's requests for service and buffer segments of information programs for delivery to subscribers in real-time under the subscriber's interactive control; and customer premises equipment. The central offices employ CO buffers, and each CO buffer includes: processors, for administering internal buffer operations and processing subscribers requests based upon the service presentation script and a program presentation map; interfaces for providing external access; busses for internal transport; buffer storage for storing segments of information programs; and memory storage for storing the script and map.

19 Claims, 8 Drawing Sheets

COMMUNICATIONS ARCHITECTURE AND BUFFER FOR DISTRIBUTING INFORMATION SERVICES

RELATED APPLICATION

U.S. patent application Ser. No. 07/884,515, entitled "Communication Architecture and Method for Distributing Information Services", filed on May 15, 1992 concurrently with the present application for A. D. Gelman, H. Kobrinski, L. S. Smoot and S. B. Weinstein is assigned to Bell Communications Research and contains subject matter related to the subject matter of the present application.

FIELD OF INVENTION

This invention relates to a store-and-forward communications architecture for delivering interactive information services, and specifically to a buffer structure which can be employed in the communications architecture.

BACKGROUND OF THE INVENTION

In U.S. patent application Ser. No.07/884,415 entitled "Communication Architecture and Method for Distributing Information Services", filed on May 15, 1992 concurrently with the present application for A. D. Gelman, H. Kobrinski, L. S. Smoot, and S. B. Weinstein and incorporated herein by reference, the limitations associated with conventional technologies for delivery of information programs are discussed. An object of this related U.S. patent application is a store-and-forward communications architecture and method for distributing information programs.

An object of the present application is a novel buffer structure which can be employed in the store-and-forward architectures such as described in the related U.S. patent application.

SUMMARY OF THE INVENTION

Our invention is employed in a store-and-forward architecture for providing information programs to subscribers on demand. This architecture stores information programs from single or multiple vendors, forwards segments of requested programs in high speed bursts, and buffers the segments for interactive play-out of the requested programs to subscribers in real time. This architecture builds upon a broadband network infrastructure, such as the Broadband Integrated Services Digital Network (BISDN), and efficiently and economically provides subscribers with information programs by promoting maximal sharing of the network, information programs, and storage media while supporting on-demand access.

The major elements of such an architecture include: information warehouses (IWHs), central offices (COs), and customer premises equipment (CPE). IWHs serve as storage locations where information programs are archived. The IWHs also store service presentation scripts and program presentation maps, which are used for managing the play-out of information programs. Another function of the IWH is to dispense scripts, maps, and information programs to COs as requested.

In addition to the functions conventionally provided at COs in broadband networks, COs of such an architecture also manage subscribers' requests for information programs based upon associated scripts and maps retrieved from appropriate IWHs. By employing scripts and maps, the CO can manage subscribers' requests for information programs without specific knowledge of the type of service being requested or the content of the information program. Another function of the CO is to request information programs in segments comprising all or part of information programs from appropriate IWHs and buffer the segments once received for play-out to subscribers.

The CPE is the customer's interface to this architecture. At the CPE, a subscriber places a request for an information program, and the CPE presents the requested program for use by the subscriber. At this interface, the subscriber has interactive control of the play-out of requested information programs.

The CO communicates with IWHs via high speed trunks operating at standard broadband rates (typically, 155 Mb/s or 622 Mb/s) and with subscribers over low-speed transmission links operating at rates such as 1.5 Mb/s downstream and several kilobits upstream for transport of control information. Information programs are transferred in segments from the IWHs to COs in a burst mode at transmission rates nominally greater than real-time, and then these information programs, which are buffered at the CO, are delivered in real-time from the CO to subscribers' CPEs.

Under this architecture, a dedicated high speed link facility is not required between a service vendor and a subscriber to provide on-demand, interactive services. Since programs are delivered from IWHs to COs in segments at rates typically exceeding real time and due to network scheduling, our architecture allows information programs to be provided to subscribers on demand with minimal congestion in the trunk network. Furthermore, trunk connections between IWHs and COs need only be maintained long enough to complete the transmission of the segments of the information program requested, and after the transmission is complete, the trunk is available to service other requests or for use elsewhere in the network.

From the subscriber's viewpoint, this architecture offers virtually unlimited on-demand access to information programs from a wide variety of vendors without the need of any costly, special hardware for storage and play-out capabilities as in other proposed alternatives. Furthermore, the customer will be alleviated from the inconvenience of personally visiting a program vendor (i.e. a video store) to access a program and returning the program after use. In addition, the subscriber is not constrained by the limited program options offered by broadcast networks, and unlike broadcast programs, the subscriber has control over the play-out of the information program.

Our inventive CO buffer comprises interfaces for providing external access to the CO buffer and processors, which administer internal operations of the buffer and process subscriber requests based upon a service presentation script and a program presentation map corresponding to the information program selected. Also, in accordance with an aspect of our invention, the CO buffer comprises busses for providing internal transport of data and control signals between components of the buffer, buffer storage for storing segments of the information program, and memory storage for storing the script and map.

DETAILED DESCRIPTION

The store-and-forward architecture utilizing our invention facilitates the delivery of information programs to subscribers. Our architecture is especially conducive to the delivery of video services on demand; however, our architecture can support a host of services furnished by multiple vendors such as the delivery of database materials supplied by a database material distribution service, electronic magazines furnished by a magazine clearinghouse, audio programs provided by a music store, educational programs supplied by a local university, or interactive home shopping from a home-shopping service. Furthermore, in addition to providing information programs on-demand, this architecture also supports broadcast services (such as global pay per view), multicast services (such as targeted advertising aimed at communities of interest), and narrowcast (such as individual interactive video games or home banking).

Many network infrastructures may gracefully support the store-and-forward architecture and method of our invention. For the purpose of a specific illustrative example, the network infrastructure supporting our architecture and method is the broadband integrated services digital network (BISDN), which is projected to be the public switched network of the future.

Overview of BISDN

The BISDN infrastructure can be characterized as supporting high bandwidth connections (most advantageously at minimum transfer rates of 155.52 Mb/s) and rapid connection and disconnection times (times of less than 10 milliseconds are most efficacious). These characteristics make the BISDN infrastructure particularly suitable for rapidly transmitting bursts of nominally accelerated information, which our architecture discloses, through the network. When transmission of a burst of information has been completed, the network is rapidly freed up to transmit subsequent bursts of information generated by our architecture or other traffic being simultaneously supported by BISDN.

Figure 1:
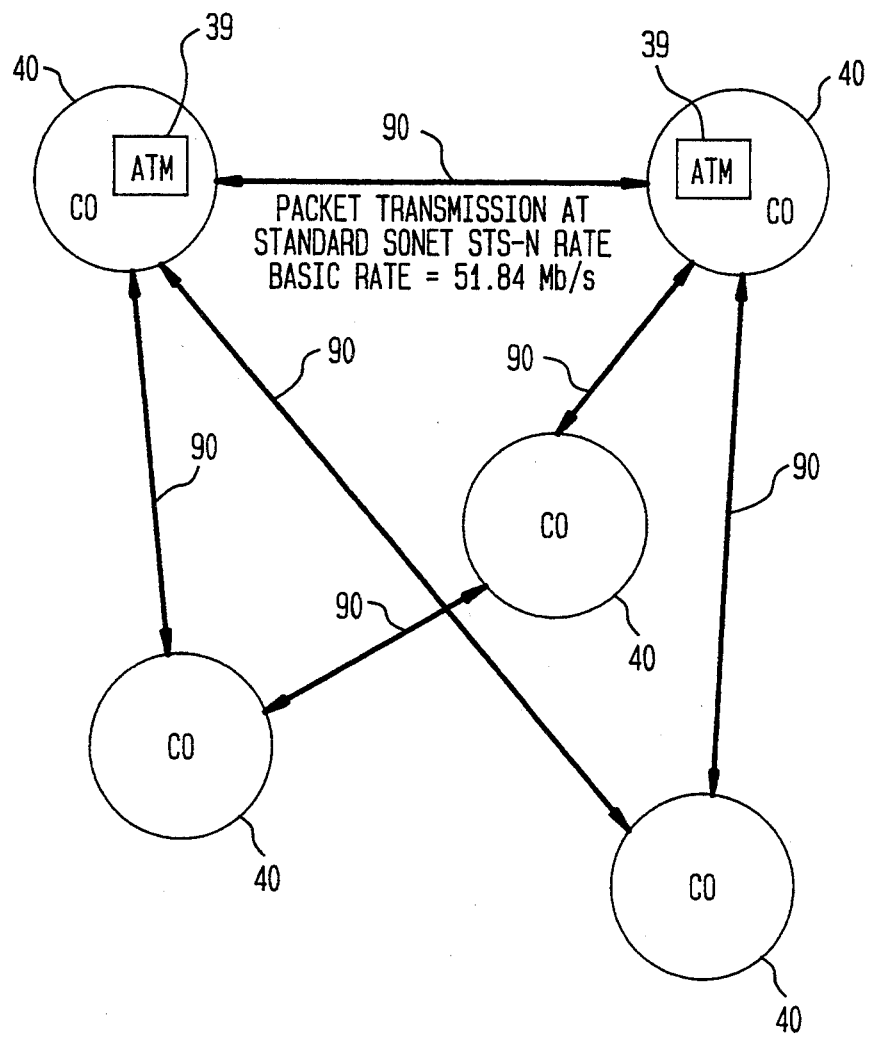
FIG. 1 depicts the Broadband Integrated Services Digital Network (BISDN) of the prior art.

FIG. 1 depicts aspects of BISDN of the prior art which provide interconnectivity for our store-and-forward architecture and method. The Central Offices (COs) 40 provide the BISDN routing function and are interconnected using high speed trunks 90, such as fiber optic transmission trunks. These trunks 90 operate at transmission rates which are part of a hierarchy of digital rates, each a multiple of the basic Synchronous Optical Network (SONET) transmission rate defined by the International Consultative Committee for Telephony and Telecommunications (CCITT).

This basic SONET transmission rate, referred to as the "STS-1" rate, is defined to be 51.84 Mb/s. Other rates in the hierarchy are defined as STS-N, where N is the whole number multiplier of the STS-1 rate. For example STS-3 would be equal to 155.52 Mb/s. BISDN typically employs Asynchronous Transfer Mode (ATM) techniques. In this technique, data is routed from point-to-point within the network in self-contained, fixed-length packets of data called "cells". The standard cell for Broadband transmission systems has been defined by the CCITT to be 53 octets in length with five octets dedicated to header information such as destination addressing information for the packet and other labeling functions.

BISDN employs ATM switching equipment 39 in the COs 40. These switching systems route cells from an originating site within the broadband network to a destination with connection establishment times of a few milliseconds. It is thus possible to send bursts of high-speed digital information from one location in the network to another. Once a cell has been routed through the network, a following cell or group of cells can be routed to the same or other locations in the network.

Detailed Description of Inventive Communications Architecture

Figure 2:
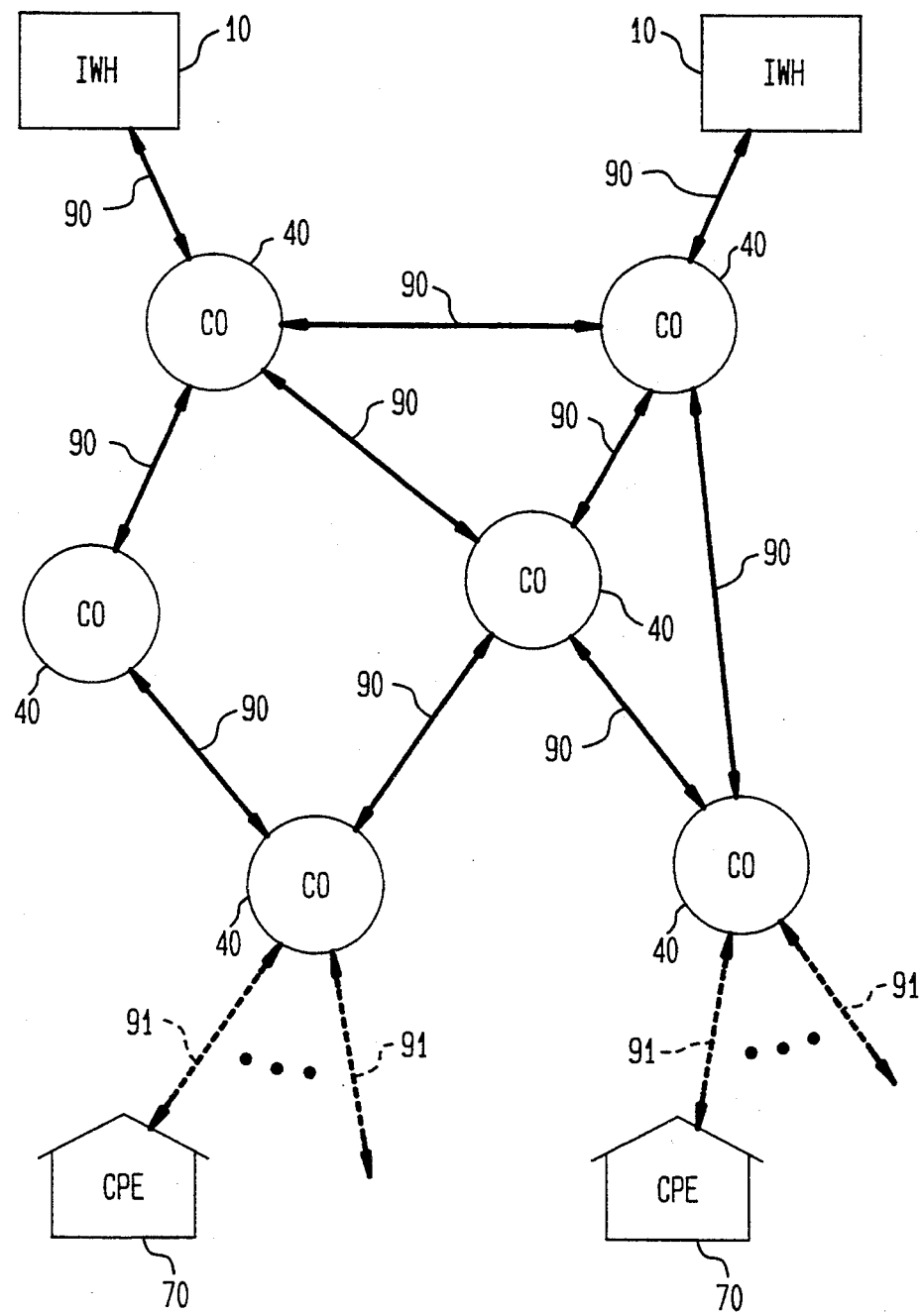
FIG. 2 illustrates the store-and-forward architecture for distributing information programs to subscribers in accordance with an aspect of our invention.

The major components of our inventive architecture, as shown in FIG. 2, include a plurality of Information Warehouses (IWHs) 10, a plurality of Central Offices (COs) 40, and a plurality of customer premises equipment (CPE) 70. Each IWH 10 may be connected to multiple COs 40 via high speed trunks 90 operating at standard broadband rates (typically SONET rates of approximately 155 Mb/s or 622 Mb/s). Multiple COs are also interconnected by high speed trunks 90. Each CO 40 may serve subscribers at multiple CPEs 70 via transmission links 91 operating bidirectionally at low-speed rates, such as 1.5 Mb/s downstream and a few kilobits/second upstream.

The asymmetrical digital subscriber line (ADSL) can advantageously be employed as the transmission link 91. ADSL is known in the communications industry as a mechanism for providing bi-directional transport from a node, such as the CO, to a subscriber at 1.5 Mb/s, downstream, and a few kilobits/second, upstream, overlaid on a telephony channel. In our architecture, information programs are transferred in segments from storage at the IWHs 10 to COs 40 in high speed bursts at rates typically much faster than real-time. The information programs are then buffered at the COs 40 and delivered in real-time from the COs 40 to subscribers' CPEs 70.

Figure 3:
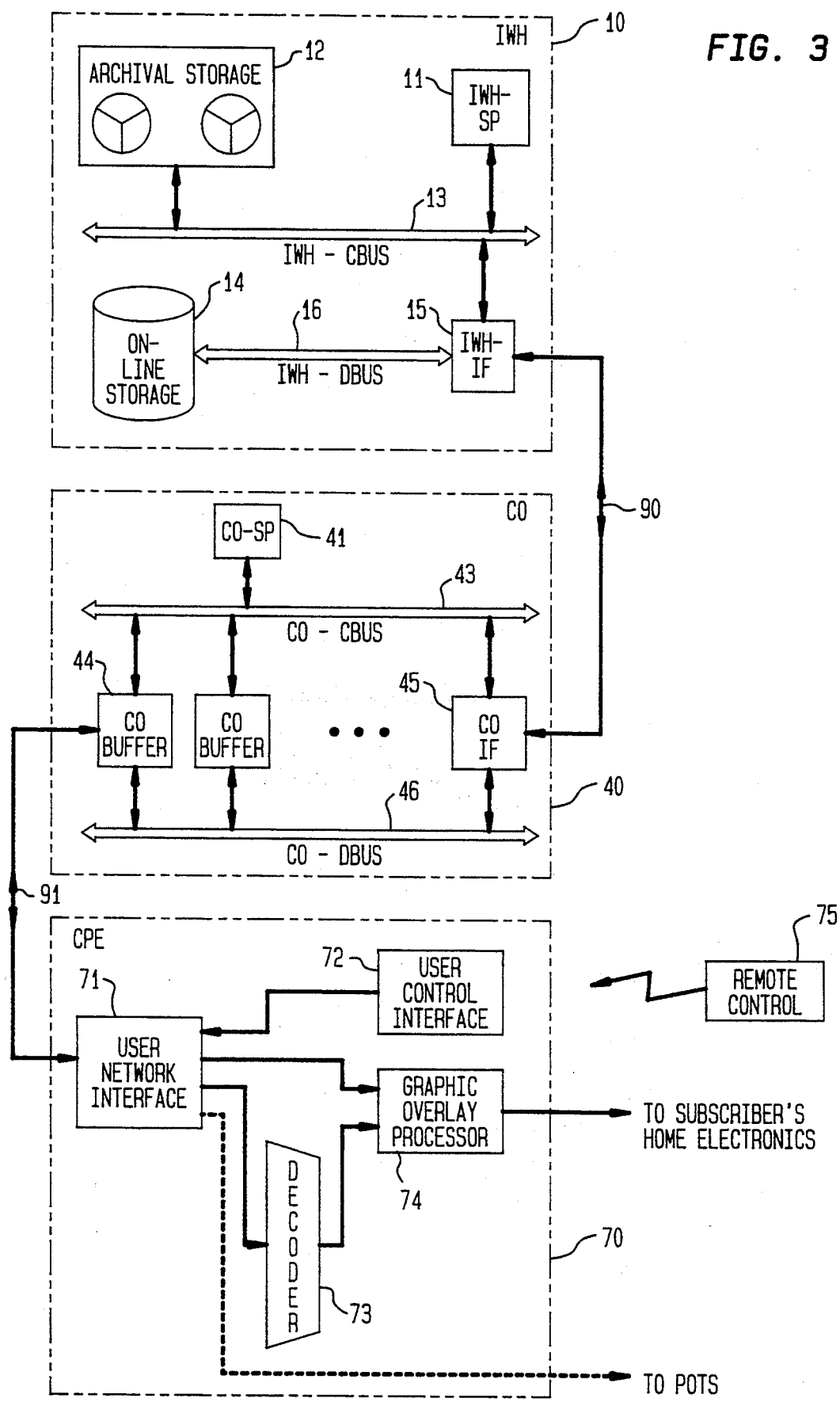
FIG. 3 depicts a simplified embodiment of our invention comprising three nodes: an information warehouse; a central office; and customer premises equipment.

For illustrative purposes, FIG. 3 depicts a three node architecture comprising an IWH 10, a CO 40, and a CPE 70 specifically to show the interconnection and internal structure of these nodes. The IWH 10 archives information programs from a single or multiple vendors and stores related service presentation scripts and program presentation maps to manage the play-out of the information programs. As shown in FIG. 3, the IWH 10 is comprised of an IWH service processor (IWH-SP) 11, archival storage 12, an IWH control bus (IWH-CBUS) 13, on-line storage 14, an IWH control and data interface (IWH-IF) 15 and an IWH data bus (IWH-DBUS) 16.

The IWH-SP 11 manages and schedules the distribution of requested information, such as scripts, maps, and information programs, from the IWH 10 in response to requests from the CO 40. The IWH-SP 11 also controls the retrieval of information from archival storage 12, which is the IWH's long-term storage, to online storage 14, which temporarily stores information for ready access and transport to the CO 40.

The IWH-IF 15 is the interface for the IWH 10 to the network. The IWH-IF 15 receives requests from the CO 40 via trunk 90 and routes these requests to the IWH-SP 11 for processing. Furthermore, information dispensed from the IWH 10 to the CO 40 is sent via the IWH-IF 15. Communications of control information between elements of the IWH 10 are transported via the IWH-CBUS 13, while communication of data, such as segments of information programs, are transported via the IWH-DBUS 16.

The CO 40 of our invention manages subscribers' requests for information programs. To support this management function the CO 40 employs, as shown in FIG. 3, a CO service processor (CO-SP) 41, a CO control and data interface (CO-IF) 45, a CO control bus (CO-CBUS) 43, a CO data bus (CO-DBUS) 46 and CO buffers 44. In response to a subscriber's request for service, the CO-SP 41 queries the IWH 10 for the appropriate script, map, and information program. Furthermore, the CO-SP 41 manages the dissemination of scripts, maps, and information programs to the appropriate CO buffer 44.

The CO-IF 45 is the CO's interface to the trunk network 90 which connects to the IWH 10. Requests from the CO-SP 41 to the IWH 10 for scripts, maps, and segments of information programs from the IWH on-line storage 14 to be downloaded into a CO buffer 44 are delivered through the CO-IF 45. CO buffers 44 receive and process subscribers requests and also store segments of an information program requested by a subscriber for immediate play-out. Also, the CO buffers manage the presentation of the requested information program to the subscriber and support the subscriber's capability to interactively control play-out of the information program.

Each CPE may have a dedicated buffer solely for the subscriber's use, or a buffer may be dynamically allocated to the subscriber at the time a request for service is made. For illustrative purposes, we assume that one of the CO buffers 44 is designated to CPE 70 as depicted in FIG. 3, and likewise, one buffer is designated to each CPE. A more detailed discussion of the CO-buffer design and operation is provided below. Segments of information programs are transported from the CO-IF 45 to the CO buffers 44 via the CO-DBUS 46. Control information, including scripts and maps, is transported between elements of the CO 40 via the CO-CBUS 43.

The CPE 70 is the subscriber's interface to the network. At the CPE 70, the subscriber places requests for information programs and interactively controls the play-out of information programs. As shown in FIG. 3, the CPE 70 is comprised of a user network interface (UNI) 71, a user control interface (UCI) 72, a graphics overlay processor 74, and a decoder 73. Subscriber's requests are generated at the UCI 72. As illustratively shown in FIG. 3, the UCI 72 could be operated remotely, thereby allowing the subscriber to make requests or input interactive control signals by remote control 75, which is shown in greater detail in FIG. 6.

The UNI 71 receives the subscriber's request for an information program or interactive control signal generated at the UCI 72 and transmits this information to the CO buffer 44 designated to the subscriber via transmission link 91. Furthermore, the UNI 71 receives the requested information program from the CO buffer 44 in real-time via transmission link 91. The graphics overlay processor 74 receives signalling information through the UNI 71 via trunk 91 from CO buffer 44. This signalling information controls the overlay of text and graphics on the information program played to the subscriber. Upon receiving the information program, the UNI 71 passes the program to the decoder 73, where the program is decoded to its original signal form (e.g. analog) for use by the subscriber.

Detailed Description of Inventive CO-Buffer System

As shown in FIG. 3, the CO buffer system is comprised of a cluster of 1 to N CO buffers 44. Each cluster of N CO buffers would nominally reside in a multi-shelf frame supported by CO-CBUS 43 and CO-DBUS 46. A cluster of N CO buffers is supervised by the CO-SP 41, which communicates to the BISDN network via the CO-IF 45.

Figure 4:
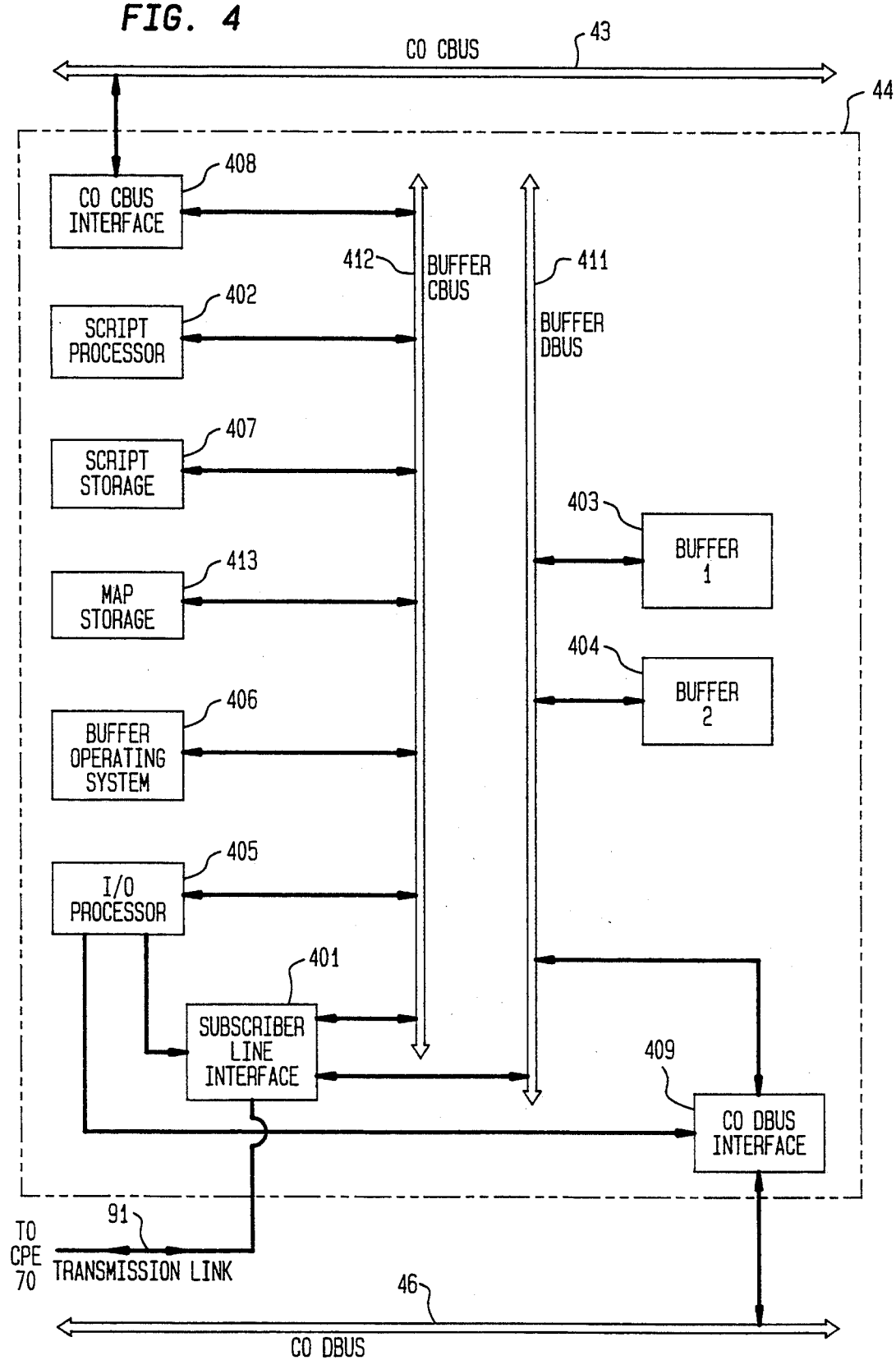
FIG. 4 shows elements of the CO buffers in accordance with an aspect of our invention.

A detailed illustration of the components of a CO buffer is shown in FIG. 4. Each CO buffer connects its designated subscriber to the communications architecture and receives and processes the subscriber's requests. Additionally, the CO buffer requests segments of an information program desired by the subscriber based upon instructions in the script and according to the map corresponding to the information program. Since data is received at the CO buffer in bursts at rates typically much higher than real time and play-out to the subscriber is in real-time, the CO buffer also provides rate conversion and smoothing functions. Other functions of the CO buffer system include managing the play-out of the requested information program to the subscriber and supporting the subscriber's capability to interactively control play-out of the information program.

To perform these functions, a CO buffer comprises a buffer operating system 406 for providing basic operating functions of the CO buffer. The CO buffer also comprises interfaces for providing external access to the CO buffer, processors for managing and administering the internal operations of the CO buffer, busses for providing internal transport of data and control signals between components of the CO buffer, and buffers and storage memory for storing segments of the information program and its associated script and map. Specifically, the subscriber line interface 401 links the CO buffer to its designated subscriber CPE 70 via transmission link 91.

A variety of subscriber line interfaces can be employed depending upon the types of services being provided to the subscriber and the upstream and downstream bandwidth capabilities required by the subscriber. Illustratively, the Asymmetrical Digital Subscriber Line (ADSL) interface may be suitable for cases such as video-on-demand delivery where the downstream bandwidth is relatively large (on the order of 1 to a few Mb/s) and the upstream signalling requirements are modest (ranging up to a few tens of kilobits/- second). An ADSL interface would also support a normal telephonic channel which would allow the subscriber to receive normal telephone service as well as information programs (such as video-on-demand) via the same transmission link 91.

Alternatively, a High Speed Digital Subscriber Line (HDSL) interface could be employed where bi-directional, moderately high-speed transmission is required in both the upstream and downstream directions. Different interfaces could be employed without substantially effecting the operation and components of the CO buffer 44 or the CO 40.

Other interfaces include the CO-CBUS interface 408, which links the CO buffer to the CO CBUS 43, and the CO-DBUS interface 409, which links the CO buffer to the CO DBUS 46. The script and map associated with the information program are passed via the CO CBUS 43 to the CO CBUS interface 408 and then passed via the buffer CBUS 412 to the script storage 407 and map storage 413 where the script and map are stored, respectively.

Segments of the information program received from the IWH are passed via the CO DBUS 46 to the CO DBUS interface 409 and then passed via the buffer DBUS 411 to buffer-1 403 or buffer-2 404 where segments are stored. Segments of the information program can be received at and played out from both buffer-1 403 and buffer-2 404 in a ping-pong (i.e., alternating) manner. For example, while segments of the information program are being received at buffer-1 403, segments stored at buffer-2 404 are being played-out to the subscriber. When segments are depleted in buffer-2 404, the I/O processor 405, as instructed by the script processor 402, causes segments of the information program to be played-out from buffer-1 403. In addition, the I/O processor causes segments from the IWH (10 of FIG. 3) to be received at buffer-2 404.

The CO buffer is controlled by two processors: the script processor 402 and the I/O processor 405. The script processor 402 executes the script stored in script storage 407 to control the provisioning of service to the subscriber. The I/O processor 405 controls input of data at the CO DBUS interface 409 and directs date to the appropriate buffer (buffer-1 403 or buffer-2 404) based upon commands from the script processor 402. In addition, the I/O processor 405 controls the play-out of the information program to the subscriber via the subscriber line interface 401. Controlling play-out of the information program may entail composing a multiplexed bit stream based upon the requirements of the service being provided. For example, for video-on-demand programs, there may be a need to assemble a bit stream according to the Moving Picture Experts Group (MPEG) Standard from the video and audio segments and also to launch control information to be used by the CPE 70.

The operation of the CO buffer in response to receiving a control signal from the subscriber is summarized as follows. The control signal is received from the subscriber via the subscriber line interface 401. The control signal is routed via the buffer CBUS 412 to the script processor 402, which takes action based upon instructions in the script associated with the control signal.

As the contents of the active buffer (for example, buffer-1 403) are being depleted and additional segments of the information program are required, or when additional segments are otherwise required, the script processor 402, after consulting with the map, sends a request for additional segments, via the buffer CBUS 412, the CO CBUS interface 408, and the CO-CBUS 43 to the CO-SP 41 (see FIG. 3). The script processor 402 concurrently commands the I/O processor 405 to prepare to accept segments of the information program from the CO DBUS 46 via the CO DBUS interface 409 and informs the I/O processor 405 of the structure of the segments of the information program to be received.

The structure in the case of a video-on-demand program would consist of the field sizes of all incoming video segments and the substructure fields of the segments, such as I-frame sizes, interpolated/predicted frame sizes, audio segment boundaries, etc. Communications between the script processor 402 and the I/O processor 405 may be interrupt-based in order to accommodate the time-sensitive features of various types of information programs.

If, according to instructions in the script, control information has to be passed to the CPE, a control message is formed by the script processor 402 and passed to the I/O processor 405 via the buffer CBUS 412 to be multiplexed into the signal sent from the subscriber line interface 401 to the subscriber's CPE 70. Illustratively, in the case of video-on-demand, the control message passing mechanism may be specified by the MPEG standard, can be incorporated as instructed by the script, and multiplexed into the subscriber's downstream signal by the subscriber line interface 401 as described above.

DETAILED ILLUSTRATIVE EXAMPLE

For a more detailed discussion of our inventive architecture, we provide a step-by-step discussion of the interaction of architectural elements and the transfer of signals in response to a subscriber's request. Since video is one of the more bandwidth-consuming programs currently contemplated for delivery and on-demand services offer significant flexibility to subscribers and imposes the greatest demand on the network, our illustrative discussion below is based upon video-on-demand.

Prior to a discussion of how our inventive architecture provides a video program to a subscriber on demand, we will first address the storage of video programs from multiple vendors at the IWH 10.

Storage/Encoding of Video Programs

Source materials from a single or multiple vendors, which previously have been digitally compressed, are stored as information programs at the IWH 10 in archival storage 12, as shown in FIG. 3. In particular, vendors of the source materials may employ encoding procedures consisting of various operations on the original sequence of images, or frames, so as to reduce the information rate required to transmit these frames. The video and audio compression technique employed could be based on the standardization activities of MPEG which has produced recommendations for video coding at rates around 1–2 Mb/s. The MPEG standard is designed for entertainment picture quality.

According to the MPEG standard, the encoded bitstream contains groups of frames that start with an intraframe coded frame, where only spatial redundancies are treated for bit-rate reduction, and then a sequence of predicted and interpolated frames, where both spatial and temporal compensation are used for a higher level of compression. Under the MPEG standard, the number of coded frames in a group of frames may be variable. For the purpose of fine granularity in the random access, for example, each group of frames can represent half a second of video (i.e. consist of 15 frames) starting with the intraframe information and followed by a sequence of interpolated and predicted frames. To reconstruct the original video signal, groups of frames must be accessed sequentially. However, some operations (e.g. forward and reverse searches) can be implemented by retrieving the intraframes only. For more detailed information relating to the MPEG standard, see "MPEG: A Video Compression Standard for Multimedia Applications", Didier LeGall Communications of the ACM, Vol. 34, No. 4, April 1991.

To minimize the amount of storage required for bandwidth intensive materials, programs may be stored in compressed form. For example, an uncompressed National Television Standard Committee (NTSC) video program, digitized at a rate of about 100 Mb/s, would take nearly 100 Gigabytes of storage for two hours of material. The same material compressed to the 1.5 Mb/s rate requires only 1.5 Gigabytes storage capacity. Since information vendors (particularly video vendors) will have to store large quantities of bandwidth-intensive information programs, and in view of the latest developments in coding algorithms at rates around 1-2 Mb/s, we assume for illustrative purposes that the source material is stored in a compressed form, tailored to an existing low-rate transmission standard such as 1.544 Mb/s corresponding to the DS-1 North American telephone network digital transmission rate.

The type of archival storage employed at the IWH may have to meet several requirements especially within the context of video information services. Each IWH 10 may contain several thousand video programs with lengths ranging from a few minutes to several hours. These archived programs might be handled in a 'jukebox' fashion using, for instance, automated digital-type carousels. This arrangement implies several seconds to minutes access time to archived programs.

Magnetic disk storage technology (or other low latency, high capacity systems) may be advantageously employed for on-line storage 14 purposes. Magnetic disk systems have access times of a few to tens of milliseconds and can reach hundreds of Mb/s transfer rates using parallel head systems or arrays of disk drives. Only the programs currently being accessed by subscribers have to be kept on-line at any given time.

Delivery of Video Program

Once video programs are encoded, compressed, and stored in the IWH 10, programs can be dispensed in segments to meet subscriber's requests for service. A subscriber generates a request for video-on-demand service through interaction with the CPE 70, and upon this request being received and processed at the CO buffer 44, the CO-SP 41 requests a service presentation script from the IWH 10. The script is a set of instructions to be executed by the CO for furnishing interactive video-on-demand service to the subscriber. The state diagram of a representative script for this service is depicted in FIG. 5 and is discussed below.

The script is passed from the IWH 10 to the CO-IF 45 via trunk 90. The script is then directed to the appropriate CO buffer 44 under the supervision of the CO-SP 41, and the CO buffer 44 uses the script to manage and control service to the subscriber.

Figure 5:
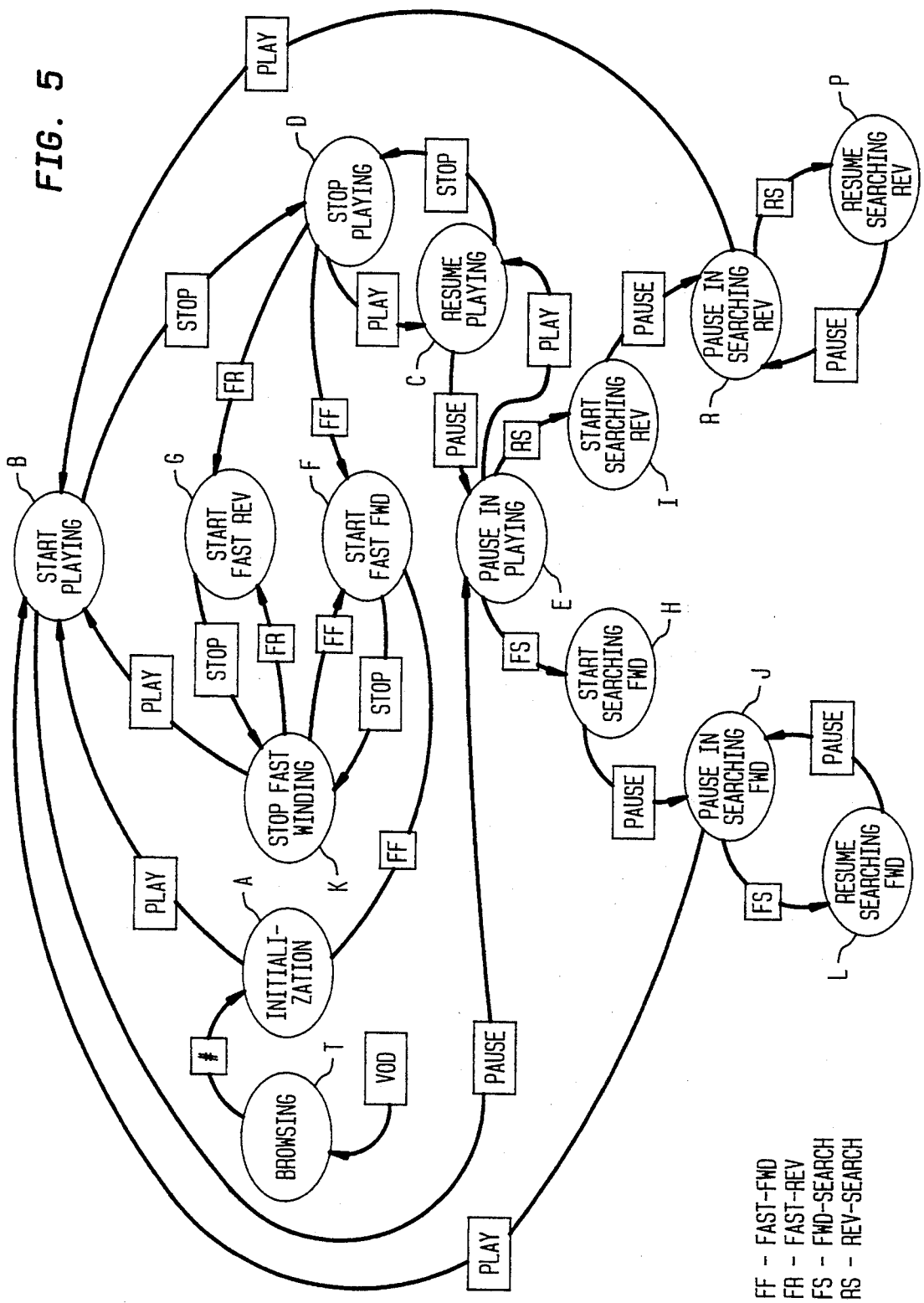
FIG. 5 depicts a state diagram modeling the presentation script for video on demand service in accordance with an aspect of our invention.

As instructed by the script, the CO buffer 44 provides a listing of available video programs, along with navigational aides to permit the subscriber to browse through the listing (state T of FIG. 5). Once the subscriber places a request for a video program by its corresponding program number, initialization, state A, begins. During this state, the CO buffer 44 may acknowledge the subscriber's program request by indicating on the subscriber's display screen in graphics overlay fashion the title of the program selected. The CO-SP 41 also sends a request to the IWH 10 for the program presentation map corresponding to the requested video program. The map contains information to be used by the CO buffer 44 to manage the presentation of the program to the subscriber which includes segmentation information (i.e., the number of segments in the program and the size of each segment) and field sizes. In addition to transmitting the map as requested, the IWH-SP 11 sends a control message via the IWH-CBUS 13 to have the requested information program retrieved from archival storage 12 and stored in the on-line storage 14 (if the program is not already on line) where the information is temporarily stored for fast retrieval.

Once initialization is completed, a "READY" indication is sent to the subscriber from the CO buffer 44 using the CPE graphics overlay 74 as described above. At this state, the program requested by the subscriber is still stored at the IWH 10 in on-line storage 14, and the CO buffer 44 awaits a signal from the subscriber to begin play-out of the requested program. Upon receiving the "PLAY" signal from the subscriber, the CO buffer 44 acknowledges the receipt of the subscriber's signal by displaying "PLAY" on the subscriber's display screen using the CPE graphics overlay processor 74 as shown in FIG. 3.

The CO buffer 44 then sends a control message to the CO-SP 41 to have particular segments of the information program transmitted to the buffer based upon information in the map. The CO-SP 41 then requests segments from the selected IWH 10.

Upon detecting conducive traffic conditions based on information obtained from the network, the IWH-SP 11 orders the transmission of segments at a rate typically faster than or at least equal to real time from on-line storage 14 via the IWH-IF 15 to the CO 40. These segments are received at the CO-IF 45 and are stored at the CO buffer 44, which is designated or dedicated to the subscriber. The program is played-out from the buffer 44 in real time to the subscriber (state B). As the program is played out to the subscriber and the buffer is being depleted, the CO-SP 41 requests additional program segments from on-line storage 14 at the IWH. Upon receiving the request, the IWH-SP 11 checks traffic conditions in the network and schedules the transport of the requested segments to the CO 40 in high speed bursts.

Figure 6:
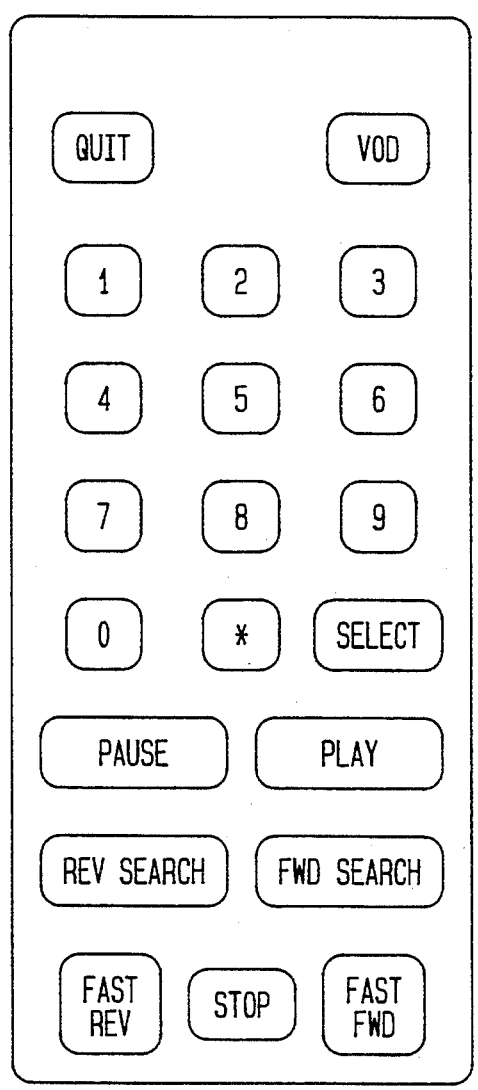
FIG. 6 depicts an illustrative embodiment of a remote control which may be employed at the customer premises equipment in accordance with an aspect of our invention.

The subscriber has the capability to interactively control the play-out of the program. Specifically, the control functions available to the subscriber, which are interpreted by the CO-SP 41 using the service presentation script, include stop (STOP), pause (PAUSE), fast rewind (FAST-REW), fast forward (FAST-FWD), forward search (FWD-SEARCH), and reverse search (REV-SEARCH). Any of these control functions can be selected from the remote control as shown in FIG. 6. When a subscriber selects any of these control functions, the CO buffer 44 acts based on instructions found in the presentation script, and in each case, acknowledges the subscribers' control message by instructing the graphics overlay processor to present on the subscriber's display screen an indicator (e.g. "PLAY") of the control function selected along with an indication as to the current viewing position in the program such as a horizontal bar graph.

Figure 7A:
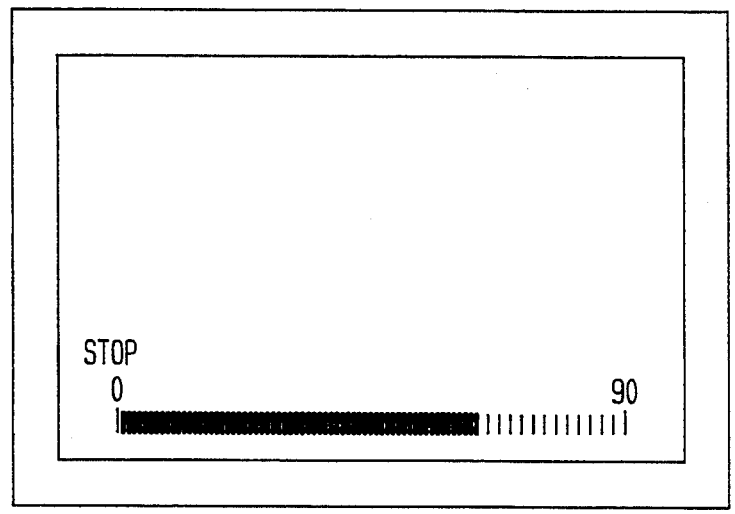
FIGS. 7a-7f depict information presented on a subscriber's screen indicating the function selected and the subscriber's current viewing position within an information program in accordance with an illustrative embodiment of our invention.
Figure 7B:
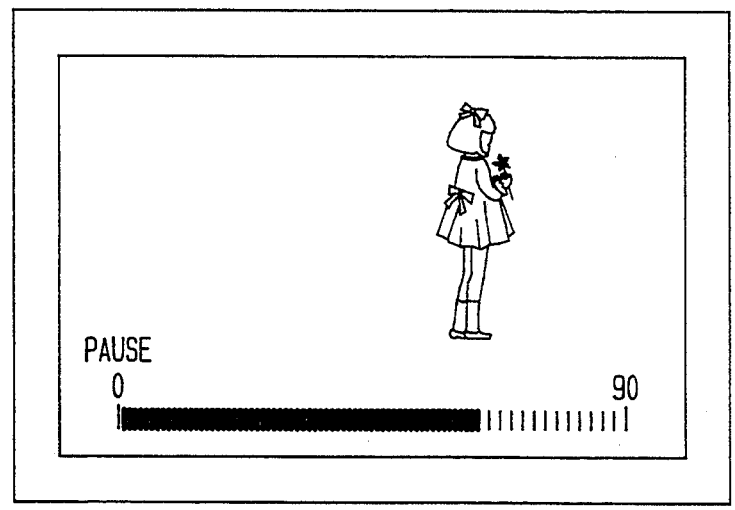

When the STOP function is selected (states D and K), the CO buffer 44 halts the play-out from the buffer to the subscriber and provides a blank screen with the function selected (STOP) displayed as shown in FIG. 7a. Selection of the PAUSE (states E, J, and R) function causes the next intraframe from the buffer to be continuously re-played as shown in FIG. 7b. Also, as illustratively shown in FIG. 5, PLAY (state C), FWD-SEARCH (state L) and REV-SEARCH (state P) can be resumed after selecting PAUSE.

Figure 7C:
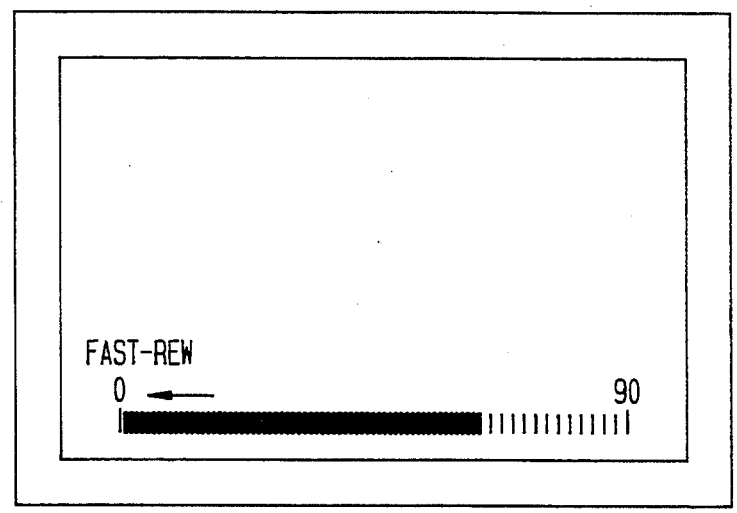
Figure 7D:
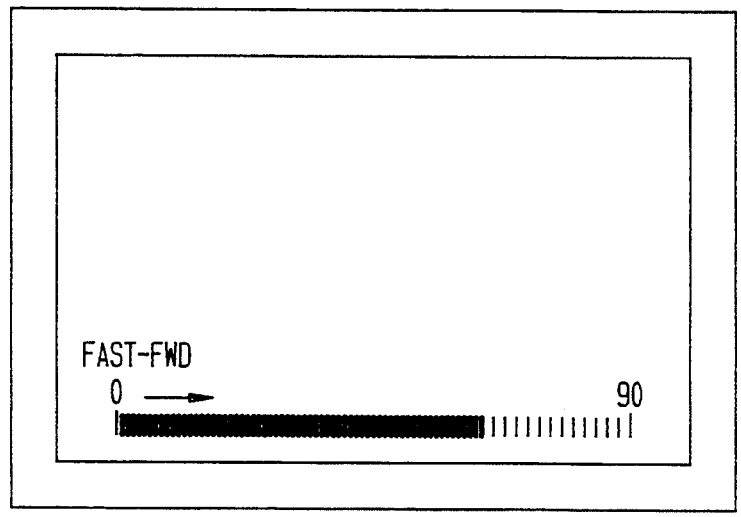

Selection of FAST-REW (state G) and FAST-FWD (state F) causes the viewing position in the program to be rapidly reversed or advanced, respectively. In response to the selection of either of these functions, the CO buffer 44 halts the play-out of the program to the subscriber and causes the graphics overlay processor 74 to provides a blank screen with the selected function overlaid on this blank screen. When the subscriber depresses the FAST-REW or FAST-FWD function button, the viewing position indicator (e.g. horizontal bar graph) decreases or increases, respectively, to reflect the change in viewing position (FIGS. 7c and 7d).

Upon reaching the desired viewing position, the subscriber presses STOP (state K) followed by PLAY (state B), and then the CO-SP 41 requests segments from on-line storage 14 at the IWH 10 corresponding to the new viewing position in the program. These segments are retrieved and placed into the subscriber's CO buffer 44. It should be emphasized that no transmission of segments from the IWH 10 to the buffer 44 takes place until the new viewing position is established following the selection of the FAST-REW and FAST-FWD control functions.

Selection of REV-SEARCH (state I) and FWD-SEARCH (state H) control functions causes intraframes of each group of frames in the program to be played out to the subscriber in the reverse or forward direction, respectively. Intraframes occur in the program at half-second intervals and are played out in repeating groups. Playing out intraframes creates the perception of play-out of the video program at a rate faster than real time; however, in fact the transmission rate from the subscriber's buffer to the CPE 70 does not change, but only intraframes from each group of frames in the program are transmitted.

Figure 7E:
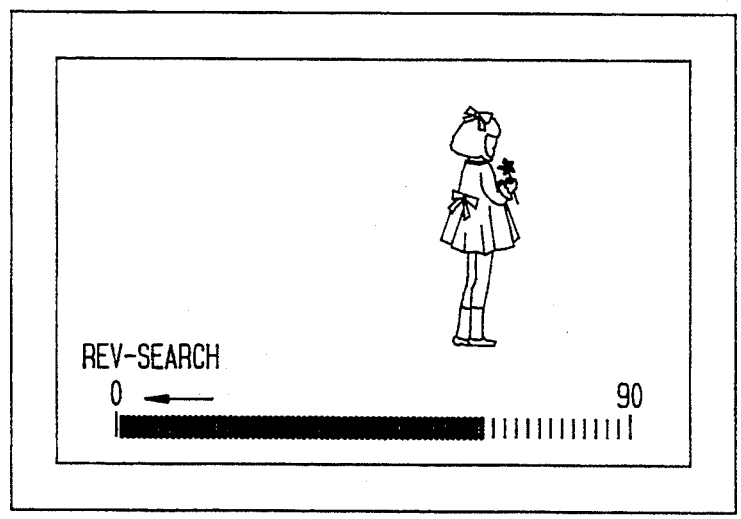
Figure 7F:
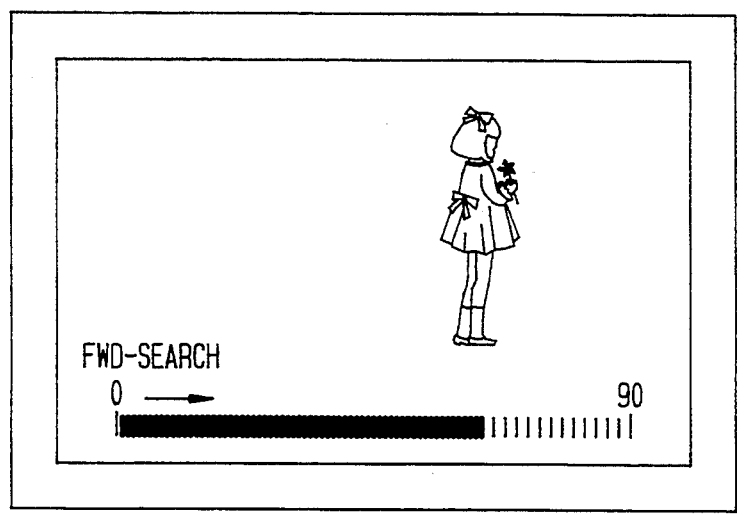

Under normal play-out conditions, as the CO buffer 44 is being depleted, additional segments of the program are requested from the IWH 10 and transmitted to the CO buffer 44. When the subscriber depresses the REV-SEARCH or FWD-SEARCH function button, a viewing position indicator may be depicted on the screen in overlay fashion on the information program, and the indicator (e.g. horizontal bar graph) decreases or increases, respectively, to reflect the change in viewing position. (Figs. 7e and 7f).

CONCLUSION

A store-and-forward architecture for providing information programs supplied by a single or multiple vendors has been described. The major components of this architecture include a plurality of Information Warehouses (IWHs), a plurality of Central Offices (COs) which include novel buffer structures, and a plurality of customer premises equipment (CPE). Each IWH is connected to multiple COs via high-speed trunks operating at standard broadband rates, and each CO serves subscribers at multiple CPE via transmission links typically operating at low speeds.

Our inventive CO buffer comprises interfaces for providing external access to the CO buffer and processors, which administer internal operations of the buffer and process subscriber requests based upon a service presentation script and a program presentation map corresponding to the information program selected. Also, in accordance with an aspect of our invention, the CO buffer comprises busses for providing internal transport of data and control signals between components of the buffer, buffer storage for storing segments of the information program, and memory storage for storing the script and map.

The IWH archives information programs from single or multiple vendors for distribution as requested. The CO manages subscribers' requests and buffers segments of the requested information programs received from the IWH. Information programs are transferred in segments from storage at the IWHs to COs in bursts at rates typically faster than real-time. The information programs are buffered at the COs and delivered in real-time from the COs to subscribers' CPE. The CPE serves as the subscriber's interface to the network architecture for receiving requested programs and interactively controlling play-out of requested programs. Numerous other alternative embodiments of our inventions may be devised without departure from the spirit and scope of the following claims.

What is claimed is:

1. A store-and-forward architecture for distributing information programs to subscribers, comprising:
    a plurality of information warehouses (IWHs) which include means for archiving information programs and means for dispensing segments of said information programs in bursts;
    a plurality of central offices (COs) which request and receive said segments of information programs from said IWHs for play-out to subscribers in real-time, wherein each of said COs comprises
    1 to N buffers, each of said buffers comprising interface means for external access to said buffer thereto, processor means for managing a subscriber's request for an information program based upon a service presentation script and a program presentation map corresponding to said information program and for managing and administering internal operations of said buffer, buffer storage means for storing segments of said information program, memory storage means for storing said script and map associated with said information program, and bus means connected to said interface means, said processor means, said buffer storage means, and said memory storage means for providing internal transport of data and control signals there between; and
    a plurality of customer premises equipments (CPEs) wherein each of said CPE is serviced by one of said buffers and is the subscriber's interface for generating requests and control signals for interactive play-out and receiving and processing information programs for the subscriber's use.

2. The store-and-forward architecture of claim 1 wherein said processor means comprises
    a script processor for executing said script corresponding to said information program and an I/O processor for controlling input and output at said interface means of each said buffer.

3. The store-and-forward architecture of claim 2 wherein said buffer storage means comprises
a first buffer, and
a second buffer, and wherein said first and said second buffers are used in a ping-pong manner.

4. The store-and-forward architecture of claim 2 wherein said memory storage means comprises
script storage for storing said script corresponding to said information program and
map storage for storing said map corresponding to said information program.

5. The store-and-forward architecture of claim 1 wherein said bus means comprises
a control bus for transporting control information and
a data bus for transporting segments of information programs at high speeds, and, wherein said control bus and said data bus are decoupled for consistently fast delivery of information program segments.

6. The store-and-forward architecture of claim 2 wherein said buffer further comprises a buffer operating system.

7. The store-and-forward architecture of claim 1 wherein each of said COs further comprises:
an interface which interfaces said CO to said IWHs;
busses which are internal communications links within said CO; and
a service processor, wherein said service processor queries said IWHs for segments of information programs and said corresponding scripts and maps and administers dissemination of scripts, maps, and segments of information programs received from said IWHs to buffers.

8. A store-and-forward architecture for distributing information programs to subscribers, comprising:
a plurality of information warehouses (IWHs) which archive information programs and dispense segments of information programs in bursts;
a plurality of central offices (COs) which request and receive said segments of information programs from said IWHs for play-out to subscribers in real-time, wherein each of said COs comprises
an interface which interfaces said CO to said IWHs;
busses which are internal communications links within said CO, wherein said busses comprise
a control bus for transporting control information between elements of said CO and
a data bus for transporting segments of information programs at high speeds between elements of said CO, wherein said control bus and said CO data bus are decoupled for consistently fast delivery of information program segments between elements of said CO; and
a CO service processor, wherein said CO service processor queries said IWHs for segments of information programs and said corresponding scripts and maps and administers dissemination of scripts, maps, and segments of information programs received from said IWHs to buffers
and wherein COs further comprises 1 to N buffers, each of said buffers comprising interface means for external access to said buffer, processor means for managing a subscriber's requests for an information program based upon a service presentation script and a program presentation map corresponding to said information program and for managing and administering internal operations of said buffer, buffer storage means for storing segments of said information program, memory storage means for storing said script and map associated with said information program, and bus means connected to said interface means, said processor means, said buffer storage means, and said memory storage means for providing internal transport of data and control signals there between; and
a plurality of customer premises equipments (CPEs) wherein each said CPE is serviced by one of said buffers and is the subscriber's interface for generating requests and control signals for interactive play-out and receiving and processing information programs for the subscriber's use.

9. The store-and-forward architecture of claim 8 wherein said interface means of each of said buffers comprises:
a control bus interface which connects said buffers to said control bus for receiving scripts and maps and transporting other control information;
a data bus interface which connects said buffer to said data bus for receiving segments of said information program; and
a subscriber line interface which connects said buffer to one of said plurality of CPEs.

10. The store-and-forward architecture of claim 9 wherein said subscriber line interface is the asymmetrical digital subscriber line interface.

11. The store-and-forward architecture of claim 9 wherein said subscriber line interface is the high speed digital subscriber line interface.

12. The store-and-forward architecture of claim 1 wherein said buffers of said CO are dynamically assigned to the subscriber when a request for service is generated.

13. The store-and-forward architecture of claim 1 wherein each of said buffers is dedicated to one of said CPEs.

14. An intelligent buffer for receiving segments of an information program and managing subscriber's requests for said information program, comprising:
interfaces for external access to said buffer;
processors for processing subscriber requests based upon a service presentation script and a program presentation map corresponding to said information program and for administering the internal operations of said buffer;
busses for providing internal transport of data and control signals between components of said buffer;
buffer storage for storing segments of said information program; and
memory storage for storing said script and map.

15. The intelligent buffer of claim 14 wherein said processors comprise
a script processor for executing said script corresponding to said information program and
an I/O processor for controlling input and output at said interfaces of the buffer.

16. The intelligent buffer of claim 14 wherein said interfaces comprises:
a control bus interface which connects the buffer to an external control bus for receiving scripts and maps and transporting other control information external to the buffer;
a data bus interface which connects the buffer to an external data bus for receiving segments of said information program; and a subscriber line interface which connects the subscriber to the buffer.

17. The intelligent buffer of claim 14 wherein said buffer storage comprises:
a first buffer storage and
a second buffer storage, and wherein said first and said second buffer storages are used in a ping-pong manner.

18. The intelligent buffer of claim 14 wherein said memory storage comprises
script storage for storing said script corresponding to said information program and
map storage for storing said map corresponding to said information program.

19. The intelligent buffer of claim 14 further comprising a buffer operating system.

* * * * *

UNITED STATES PATENT AND TRADEMARK OFFICE
CERTIFICATE OF CORRECTION

PATENT NO. : 5,341,474
DATED : August 23, 1994
INVENTOR(S) : Gelman - Kobrinski - Smoot - Weinstein It is certified that error appears in the above-identified patent and that said Letters Patent is hereby corrected as shown below:

Column 1, Line 24, after "No." change "07/884,415" to --07/884,516--

Signed and Sealed this

Twenty-seventh Day of June, 2000

Attest:

Q. TODD DICKINSON

Attesting Officer        Director of Patents and Trademarks